United States Patent [19]

Schriever

[11] Patent Number: 5,472,524

[45] Date of Patent: Dec. 5, 1995

[54] NON-CHROMATED COBALT CONVERSION COATING METHOD AND COATED ARTICLES

[75] Inventor: Matthias P. Schriever, Kent, Wash.

[73] Assignee: The Boeing Company, Seattle, Wash.

[21] Appl. No.: 212,654

[22] Filed: Mar. 11, 1994

Related U.S. Application Data

[63] Continuation of Ser. No. 621,132, Nov. 30, 1990, abandoned, which is a continuation-in-part of Ser. No. 525,800, May 17, 1990, Pat. No. 5,298,092.

[51] Int. Cl.$^6$ .................................................. C23C 22/48
[52] U.S. Cl. .......................... 148/273; 148/275; 148/285; 148/286
[58] Field of Search .................................. 148/240, 243, 148/273, 275, 285, 286

[56] References Cited

U.S. PATENT DOCUMENTS

| 1,551,613 | 9/1925 | Pacz | 148/273 |
|---|---|---|---|
| 1,607,676 | 11/1926 | Jirotka | 148/242 |
| 2,796,370 | 6/1957 | Ostrander et al. | 148/268 |
| 2,796,371 | 6/1957 | Ostrander et al. | 148/268 |
| 2,906,009 | 9/1959 | Knoll et al. | 428/626 |
| 3,138,479 | 6/1964 | Foley | 427/129 |

(List continued on next page.)

FOREIGN PATENT DOCUMENTS

| 39376/89 | 8/1990 | Australia . |
|---|---|---|
| 0405340 | 1/1991 | European Pat. Off. . |
| 405340A1 | 1/1991 | European Pat. Off. . |
| 458020A1 | 11/1991 | European Pat. Off. . |
| 0488430A2 | 6/1992 | European Pat. Off. . |
| 0523288A1 | 6/1993 | European Pat. Off. . |
| 745704 | 11/1944 | Germany . |
| 61-238979 | 10/1986 | Japan ........................... 148/286 |
| 953987 | 4/1964 | United Kingdom . |
| 1345868 | 2/1974 | United Kingdom . |
| 91/11542 | 8/1991 | WIPO . |

OTHER PUBLICATIONS

G. Jander and E. Blasius, Einführung in das anorganisch–chemische Praktikum (1968), pp. 106–107.

Van Nostrand's Scientific Encyclopedia (1983), Sixth Edition, vol. I, p. 124, "Ammines".

"Deposition of Nickel and Cobalt by Chemical Reduction," Brenner & Riddell, J. of Research of the National Bureau of Standards, pp. 385–395, vol. 39, Nov. 1947.

Pascal, Nouveau Traité de Chimie Minerale, 1959, Masson & Cie, Paris, Fr., vol. XVIII, pp. 680–681: Cobaltnitries.

"Nickel and Cobalt Films" by Samuel Wein; The Glass Industry, pp. 22, 23, 35, and 46, Jan. 1960.

"Regulating Coercivity of Magnetic Thin Films", Tsu & Sakamoto, IBM Tech. Discl. Bull., pp. 52–53, vol. 4, No. 8, Jan. 1962.

(List continued on next page.)

Primary Examiner—David A. Simmons
Assistant Examiner—Robert R. Koehler
Attorney, Agent, or Firm—Paul C. Cullom, Jr.

[57] ABSTRACT

(A.) A process for forming a cobalt conversion coating on a metal substrate, thereby imparting corrosion resistance and paint adhesion properties. The invention was developed as a replacement for the prior art chromic acid process. The substrate may be aluminum or aluminum alloy, as well as magnesium and its alloys, Cd plated substrates, and Zn plated substrates. The cobalt-III hexacoordinated complex may be present in the form of $Me_3[Co(NO_2)_6]$ wherein Me is one or more of Na, K, and Li. (B.) A chemical conversion coating solution for producing the cobalt conversion coating on a metal substrate, the solution being an aqueous solution having a pH of about 7.0 to 7.2 and containing a soluble cobalt-III hexacoordinated complex, the concentration of the cobalt-III hexacoordinated complex being from about 0.1 mole per gallon of solution to the saturation limit of the cobalt-III hexacoordinated complex. The cobalt conversion solution may be prepared by a bath makeup sequence including the steps of: (a) dissolving a metal nitrite salt; (b) dissolving an accelerator such as NaI; (c) dissolving a cobalt-II salt; and (d) then adding an oxidizer such as $H_2O_2$.

88 Claims, 10 Drawing Sheets

U.S. PATENT DOCUMENTS

| | | | |
|---|---|---|---|
| 3,403,035 | 9/1968 | Schneble et al. | 106/1.25 |
| 3,423,214 | 1/1969 | Koretzky | 106/1.22 |
| 3,438,798 | 4/1969 | Baudrand et al. | 427/304 |
| 3,444,007 | 5/1969 | Maurer et al. | 148/273 |
| 3,592,747 | 7/1971 | Cohn | 148/279 |
| 3,615,740 | 10/1971 | Goltz | 106/14.11 |
| 3,790,453 | 2/1974 | Wanamaker et al. | 205/50 |
| 3,819,424 | 6/1974 | Russell et al. | 148/261 |
| 3,870,607 | 3/1975 | Bardach | 205/122 |
| 3,877,981 | 4/1975 | Arnold | 106/1.25 |
| 3,905,838 | 4/1974 | Ito | 148/271 |
| 3,928,237 | 12/1975 | Davis | 502/313 |
| 3,954,510 | 5/1976 | Gunn et al. | 148/267 |
| 3,993,510 | 11/1976 | Bellavin | 148/268 |
| 4,088,486 | 5/1978 | Bissonette | 430/393 |
| 4,150,172 | 4/1979 | Kolk, Jr. | 427/129 |
| 4,208,212 | 6/1980 | Kuzuwata et al. | 106/2 |
| 4,218,240 | 8/1980 | Gingerich et al. | 75/365 |
| 4,233,063 | 11/1980 | Ritsko et al. | 75/374 |
| 4,261,766 | 4/1981 | Crouch | 148/273 |
| 4,278,463 | 7/1981 | Vanderpool et al. | 75/374 |
| 4,278,477 | 7/1981 | Reinhold | 106/1.27 |
| 4,337,097 | 6/1982 | Tokumasu et al. | 148/261 |
| 4,348,224 | 9/1982 | Gingerich et al. | 75/353 |
| 4,381,203 | 4/1983 | Reinhold | 148/270 |
| 4,392,920 | 7/1983 | McDonald | 205/227 |
| 4,631,093 | 12/1986 | Etemovich | 428/457 |
| 4,637,374 | 1/1987 | Arai | 427/383.7 |
| 4,647,347 | 3/1987 | Schoener | 148/273 |
| 4,659,605 | 4/1987 | Malik et al. | 427/129 |
| 4,696,724 | 9/1987 | Deguchi et al. | 148/264 |
| 4,804,407 | 2/1989 | Scheithauer et al. | 75/372 |
| 4,897,129 | 1/1990 | Tuttle, Jr. et al. | 148/256 |

OTHER PUBLICATIONS

*Chemical Abstracts,* vol. 89, 1978, abstract No. 122118c, Complexes of Cobalt containing ammonia or ethylenediamine.

M. Munakata, "Some New Oxygenated Cobalt Complexes," *Bulletin of The Chem. Soc. of Japan,* vol. 44, pp. 1791–1796 (1971).

S. Fukuzumi et al., "Activation of Cobalt (III)–Alkyl Bonds . . . ," *Chemistry Letters,* pp. 421–424 (1984).

I. Sasaki et al., "X–Ray And Electrocheimical Investigation Of A Series Of Cobalt . . . ," *Polyhedron,* vol. 6, pp. 2103–2110 (1987).

W. Fernelius ed., "69. Hexamminecobalt(III) Salts," *Inorganic Syntheses,* first edition, vol. II, pp. 216–221 (McGraw–Hill 1946).

A. Martell and M. Calvin, *Chemistry Of The Metal Chelate Compounds,* pp. 1–18 (Prentice–Hall 1952).

NON-CHROMATED COBALT CONVERSION COATING METHOD AND COATED ARTICLES

CROSS-REFERENCE TO RELATED APPLICATION

This is a continuation of application(s) Ser. No. 07/621,132 filed on Nov. 30, 1990, now abandoned which is a continuation-in-part of application Ser. No. 07/525,800, filed May 17, 1990, now U.S. Pat. No. 5,298,092 issued on Mar. 29, 1994, entitled "Non-Chromated Oxide Coating For Aluminum Substrates", which application is incorporated herein by reference.

BACKGROUND OF THE INVENTION

1) Field of the Invention

This environmental-quality invention is in the field of chemical conversion coatings formed on metal substrates, for example, on aluminum substrates. More particularly, one aspect of the invention is a new type of oxide coating (which I refer to as a "cobalt conversion coating") which is chemically formed on metal substrates. The invention enhances the quality of the environment of mankind by contributing to the maintenance of air and water quality.

2) Description of the Related Art

In general, chemical conversion coatings are formed chemically by causing the surface of the metal to be "converted" into a tightly adherent coating, all or part of which consists of an oxidized form of the substrate metal. Chemical conversion coatings can provide high corrosion resistance as well as strong bonding affinity for paint. The industrial application of paint (organic finishes) to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly the high-copper 2000-series aluminum alloys, such as alloy 2024-T3, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The resulting conversion coating on the surface of the aluminum component offers resistance to corrosion and a bonding surface for organic finishes.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for organic finishes. The present invention relates to this second type of process for producing chemical conversion coatings. The chemical solution may be applied by immersion application, by various types of manual application, or by spray application.

One widely-used chromic acid process for forming chemical conversion coatings on aluminum substrates is described in various embodiments in Ostrander et al. U.S. Pat. No. 2,796,370 and Ostrander et al. U.S. Pat. No. 2,796,371, in military process specification MIL-C-5541, and in Boeing Process Specification BAC 5719. These chromic acid chemical conversion baths contain hexavalent chromium, fluorides, and cyanides, all of which present significant environmental as well as health and safety problems. The constituents of a typical chromic acid conversion bath, such as ALODINE 1200, are as follows: $CrO_3$—"chromic acid" (hexavalent chromium); NaF—sodium fluoride; $KBF_4$—potassium tetrafluoroborate; $K_2ZrF_6$—potassium hexafluorozirconate; $K_3Fe(CN)_6$—potassium ferricyanide; and, $HNO_3$—nitric acid (for pH control).

Many aluminum structural parts, as well as Cd plated, Zn plated, Zn-Ni plated, and steel parts, throughout the aircraft and aerospace industry are currently being treated using this chromic acid process technology. Chromic acid conversion films, as formed on aluminum substrates, meet a 168 hours corrosion resistance criterion, but they primarily serve as a surface substrate for paint adhesion. Because of their relative thinness and low coating weights (40–150 milligrams/ft$^2$), chromic acid conversion coatings do not cause a fatigue life reduction in the aluminum structure.

However, environmental regulations in the United States, particularly in California, and in other countries are drastically reducing the allowed levels of hexavalent chromium compounds in effluents and emissions from metal finishing processes. Accordingly, chemical conversion processes employing hexavalent chromium compounds must be replaced. The present invention, which does not employ hexavalent chromium compounds, is intended to replace the previously used chromic acid process for forming conversion coatings on aluminum substrates.

SUMMARY OF THE INVENTION (A.) In one aspect, the invention is a process for forming a cobalt conversion coating on a metal substrate, thereby imparting corrosion resistance and paint adhesion properties. The invention was developed as a replacement for the prior art chromic acid process.

In a broad sense, the invention is a process for forming a cobalt conversion coating on a metal substrate, the process comprising the steps of:

(a) providing a cobalt conversion solution comprising an aqueous solution of a soluble cobalt-III hexacoordinated complex (hereafter referred to as cobalt-III complex), the concentration of the cobalt-III hexacoordinated complex being from about 0.1 mole per gallon of solution up to the saturation limit of said cobalt-III hexacoordinated complex; and (b) contacting the metal substrate with the solution for a sufficient amount of time, whereby the cobalt conversion coating is formed.

The substrate may be aluminum or aluminum alloy, as well as magnesium and its alloys, Cd plated substrates, and Zn plated substrates. The cobalt-III hexacoordinated complex may be present in the form of $Me_3[Co(NO_2)_6]$ wherein Me corresponds to Na, K, or Li.

(B.) In another aspect, the invention is a chemical conversion coating solution. In a broad sense, the invention is a chemical conversion coating solution for producing a cobalt conversion coating on a metal substrate, the solution comprising an aqueous solution of a soluble cobalt-III hexacoordinated complex, the concentration of said cobalt-III hexa-coordinated complex being from about 0.1 mole per gallon of solution up to the saturation limit of said cobalt-III hexacoordinated complex. The substrate may be aluminum or aluminum alloy, as well as magnesium and its alloys, Cd plated substrates, and Zn plated substrates. The cobalt-III hexacoordinated complex may be present in the form of $Me_3[Co(NO_2)_6]$ wherein Me corresponds to Na, K, or Li.

The cobalt conversion solution may be prepared by a bath makeup sequence including the steps of: (a) dissolving a metal nitrite salt; (b) dissolving an accelerator such as NaI; (c) dissolving a cobalt-II salt; and (d) then adding an oxidizer such as $H_2O_2$.

(C.) In yet another aspect, the invention is a coated article exhibiting corrosion resistance and paint adhesion properties, the article including: (a) a metal substrate; and (b) a cobalt conversion coating formed on the substrate, the cobalt conversion coating including aluminum oxide $Al_2O_3$ as the largest volume percent, and one or more cobalt oxides from the group consisting of $CoO$, $Co_3O_4$, and $Co_2O_3$. The substrate may be aluminum or aluminum alloy, as well as magnesium and its alloys, Cd plated substrates, and Zn plated substrates.

BRIEF DESCRIPTION OF THE DRAWINGS

The figures herein are photomicrographs of images produced by a scanning electron microscope (SEM) of coatings on aluminum alloy test panels. FIGS. 1–16 show surface views and fracture views of unsealed cobalt conversion coatings. The photomicrographs of FIGS. 1–16 reveal a highly porous surface oxide (unsealed cobalt conversion coatings) with a thickness range of about 0.12 to 0.14 micron (1200 to 1400 Angstroms). FIGS. 1–4 show an unsealed cobalt conversion coating formed by a 20 minute immersion in a typical cobalt coating solution. FIGS. 5–8 show an unsealed cobalt conversion coating formed by a 30 minute immersion in a typical cobalt coating solution. FIGS. 9–12 show an unsealed cobalt conversion coating formed by a 50 minute immersion in a typical cobalt coating solution. FIGS. 13–16 show an unsealed cobalt conversion coating formed by a 60 minute immersion in a typical cobalt coating solution. There were only minor differences in oxide coating thickness between these immersion times. This suggests that at any given bath operating temperature, the oxide structure becomes self limiting. FIGS. 17–20 show surface views and fracture views of a sealed cobalt conversion coating.

FIG. 1 is a photomicrograph at ×10,000 magnification of a test panel showing a cobalt conversion coating 130 of the invention. The photomicrograph is a top view, from an elevated angle, of the upper surface of oxide coating 130. The top of oxide coating 130 is porous and looks like a layer of chow mein noodles. The porosity of oxide coating 130 gives excellent paint adhesion results. This test panel was immersed in a cobalt conversion coating solution for 20 minutes. The white bar is a length of 1 micron.

FIG. 2 is a photomicrograph at ×50,000 magnification of the test panel of FIG. 1. The photomicrograph is a top view, from an elevated angle, of the upper surface of oxide coating 130. FIG. 2 is a close-up, at higher magnification, of a small area of FIG. 1. The white bar is a length of 1 micron.

FIG. 3 is a photomicrograph at ×10,000 magnification of a test panel showing a side view of a fractured cross section of a cobalt conversion coating 130 of the invention. The fractured cross section of the aluminum substrate of the test panel is indicated by reference numeral 132. This test panel was immersed in a coating bath for 20 minutes. To make the photomicrograph, the test panel was bent and broken off to expose a cross section of oxide coating 130. The white bar is a length of 1 micron.

FIG. 4 is a photomicrograph at ×50,000 magnification of the test panel of FIG. 3 showing a side view of a fractured cross section of cobalt conversion coating 130 of the invention. FIG. 4 is a close-up, at higher magnification, of a small area of FIG. 3. The aluminum substrate of the test panel is indicated by reference numeral 132. The white bar is a length of 1 micron. Oxide coating 130 has a vertical thickness of about 0.12–0.14 micron.

FIG. 5 is a photomicrograph at ×10,000 magnification of another test panel showing another cobalt conversion coating 150 of the invention. The photomicrograph is a top view, from an elevated angle, of the upper surface of oxide coating 150. The top of oxide coating 150 is porous and looks like a layer of chow mein noodles. This test panel was immersed in a cobalt conversion coating solution for 30 minutes. The white bar is a length of 1 micron.

FIG. 6 is a photomicrograph at ×50,000 magnification of the test panel of FIG. 5. The photomicrograph is a top view, from an elevated angle, of the upper surface of oxide coating 150. FIG. 6 is a close-up, at higher magnification, of a small area of FIG. 5. The white bar is a length of 1 micron.

FIG. 7 is a photomicrograph at ×10,000 magnification of a test panel showing a side view of a fractured cross section of cobalt conversion coating 150 of the invention. The aluminum substrate of the test panel is indicated by reference numeral 152. This test panel was immersed in a coating bath for 30 minutes. To make the photomicrograph, the test panel was bent and broken off to expose a cross section of oxide coating 150. The white bar is a length of 1 micron.

FIG. 8 is a photomicrograph at ×50,000 magnification of the test panel of FIG. 7 showing a side view of a fractured cross section of cobalt conversion coating 150 of the invention. FIG. 8 is a close-up, at higher magnification, of a small area of FIG. 7. The aluminum substrate of the test panel is indicated by reference numeral 152. The white bar is a length of 1 micron. Oxide coating 150 has a vertical thickness of about 0.12–0.14 micron.

FIG. 9 is a photomicrograph at ×10,000 magnification of a test panel showing a cobalt conversion coating 190 of the invention. The photomicrograph is a top view, from an elevated angle, of the upper surface of oxide coating 190. The top of oxide coating 190 is porous and looks like a layer of chow mein noodles. This test panel was immersed in a cobalt conversion coating solution for 50 minutes. The oblong object indicated by reference numeral 192 is an impurity, believed to be a piece of oxidized material, on top of oxide coating 190. The white bar is a length of 1 micron.

FIG. 10 is a photomicrograph at ×50,000 magnification of the test panel of FIG. 9. The photomicrograph is a top view, from an elevated angle, of the upper surface of oxide coating 190. FIG. 10 is a close-up, at higher magnification, of a small area of FIG. 9. The roundish object indicated by reference numeral 192a is an unidentified impurity on top of oxide coating 190. The white bar is a length of 1 micron.

FIG. 11 is a photomicrograph at ×10,000 magnification of a test panel showing a side view of a fractured cross section of a cobalt conversion coating 190 of the invention. The fractured cross section of the aluminum substrate of the test panel is indicated by reference numeral 194. This test panel was immersed in a coating bath for 50 minutes. To make the photomicrograph, the test panel was bent and broken off to expose a cross section of oxide coating 190. The white bar is a length of 1 micron.

FIG. 12 is a photomicrograph at ×50,000 magnification of the test panel of FIG. 11 showing a side view of a fractured cross section of cobalt conversion coating 190 of the invention. FIG. 12 is a close-up, at higher magnification, of a small area of FIG. 11. The aluminum substrate of the test panel is indicated by reference numeral 194. The white bar is a length of 1 micron. Oxide coating 190 has a vertical thickness of about 0.12–0.14 micron.

FIG. 13 is a photomicrograph at ×10,000 magnification of another test panel showing a cobalt conversion coating 230 of the invention. The photomicrograph is a top view, from an elevated angle, of the upper surface of oxide coating 230. The top of oxide coating 230 is porous and looks like a layer of chow mein noodles. This test panel was immersed in a cobalt conversion coating solution for 60 minutes. The white bar is a length of 1 micron.

FIG. 14 is a photomicrograph at ×50,000 magnification of the test panel of FIG. 13. The photomicrograph is a top view, from an elevated angle, of the upper surface of oxide coating 230. FIG. 14 is a close-up, at higher magnification, of a small area of FIG. 13. The white bar is a length of 1 micron.

FIG. 15 is a photomicrograph at ×10,000 magnification of a test panel showing a side view of a fractured cross section of cobalt conversion coating 230 of the invention. The aluminum substrate of the test panel is indicated by reference numeral 232. This test panel was immersed in the coating bath for 60 minutes. To make the photomicrograph, the test panel was bent and broken off to expose a cross section of oxide coating 230. The white bar is a length of 1 micron.

FIG. 16 is a photomicrograph at ×50,000 magnification of the test panel of FIG. 15 showing a side view of a fractured cross section of cobalt conversion coating 230 of the invention. FIG. 16 is a close-up, at higher magnification, of a small area of FIG. 15. The white bar is a length of 1 micron. Oxide coating 150 has a vertical thickness of about 0.12–0.14 micron.

FIG. 17 is a photomicrograph at ×10,000 magnification of another test panel showing a sealed cobalt conversion coating 270 of the invention. The photomicrograph is a top view, from an elevated angle, of the upper surface of sealed oxide coating 270. This test panel was immersed in a sealing solution for 20 minutes. Sealed oxide coating 270 is not as porous as an unsealed oxide coating, the pores of the oxide coating being partially filled by hydration as a result of immersion in a sealing solution. The partial sealing of the oxide coating gives reduced paint adhesion results, but excellent corrosion resistance performance. The whitish areas identified by reference numeral 274 are believed to be impurities from the sealing solution. The white bar is a length of 1 micron.

FIG. 18 is a photomicrograph at ×50,000 magnification of the test panel of FIG. 17. The photomicrograph is a top view, from an elevated angle, of the upper surface of sealed oxide coating 270. FIG. 18 is a close-up, at higher magnification, of a small area of FIG. 17. Sealed oxide coating 270 is not as porous as an unsealed oxide coating, the pores of the oxide coating being partially filled by hydration as a result of immersion in a sealing solution. The white bar is a length of 1 micron.

FIG. 19 is a photomicrograph at ×10,000 magnification of a test panel showing a side view of a fractured cross section of sealed cobalt conversion coating 270 of the invention. The aluminum substrate of the test panel is indicated by reference numeral 272. This test panel was immersed in the sealing bath for 20 minutes. To make the photomicrograph, the test panel was bent and broken off to expose a cross section of oxide coating 270. The white bar is a length of 1 micron.

FIG. 20 is a photomicrograph at ×50,000 magnification of the test panel of FIG. 19 showing a side view of a fractured cross section of sealed cobalt conversion coating 270 of the invention. FIG. 20 is a close-up, at higher magnification, of a small area of FIG. 19. The white bar is a length of 1 micron. Sealed oxide coating 270 has a vertical thickness of about 0.12–0.14 micron.

DESCRIPTION OF THE PREFERRED EMBODIMENTS

Figure 1:
FIGS. 1–20 are photomicrographs (scanning electron microscope operated at 20 KV) of aluminum alloy 2024-T3 test panels with cobalt conversion coatings made by the invention.
Figure 2:
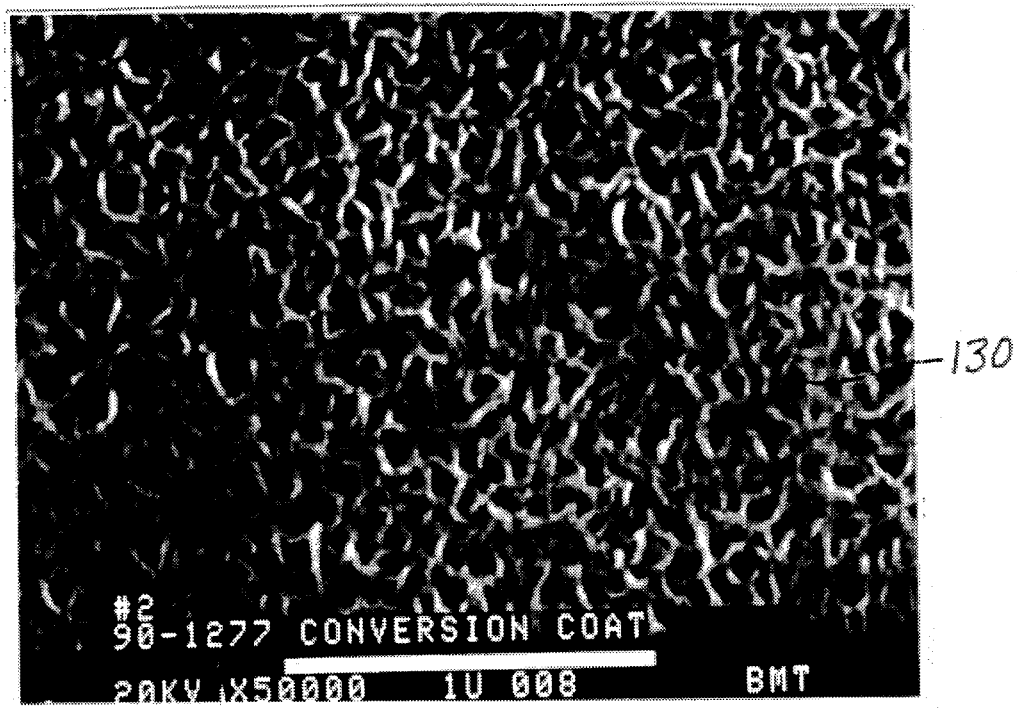
Figure 3:
Figure 4:
Figure 5:
Figure 6:
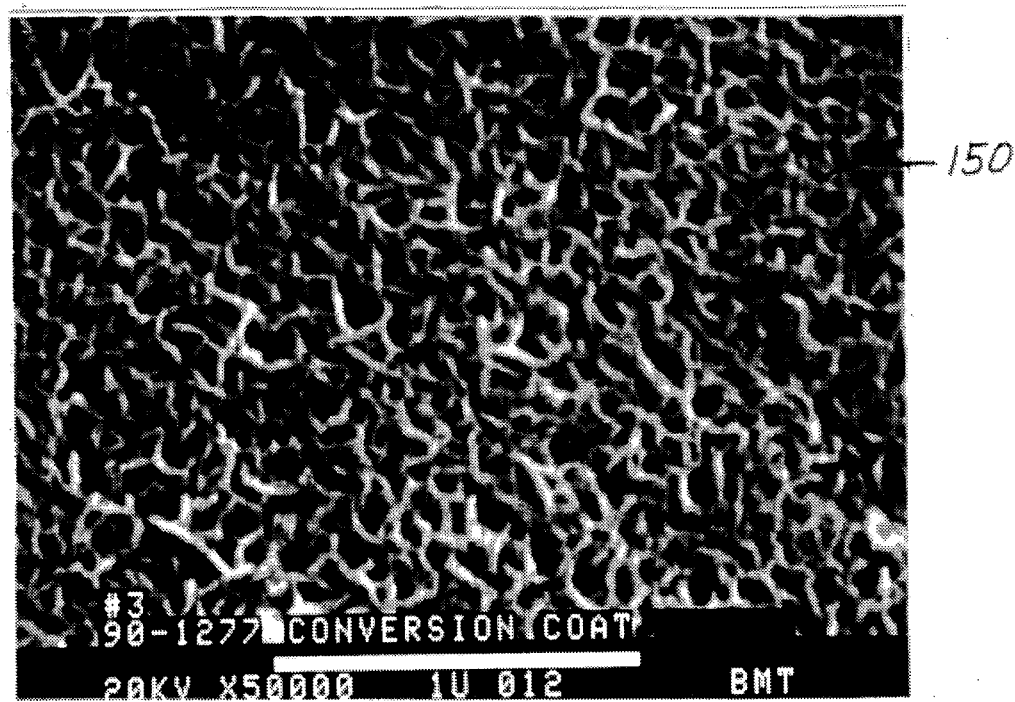
Figure 7:
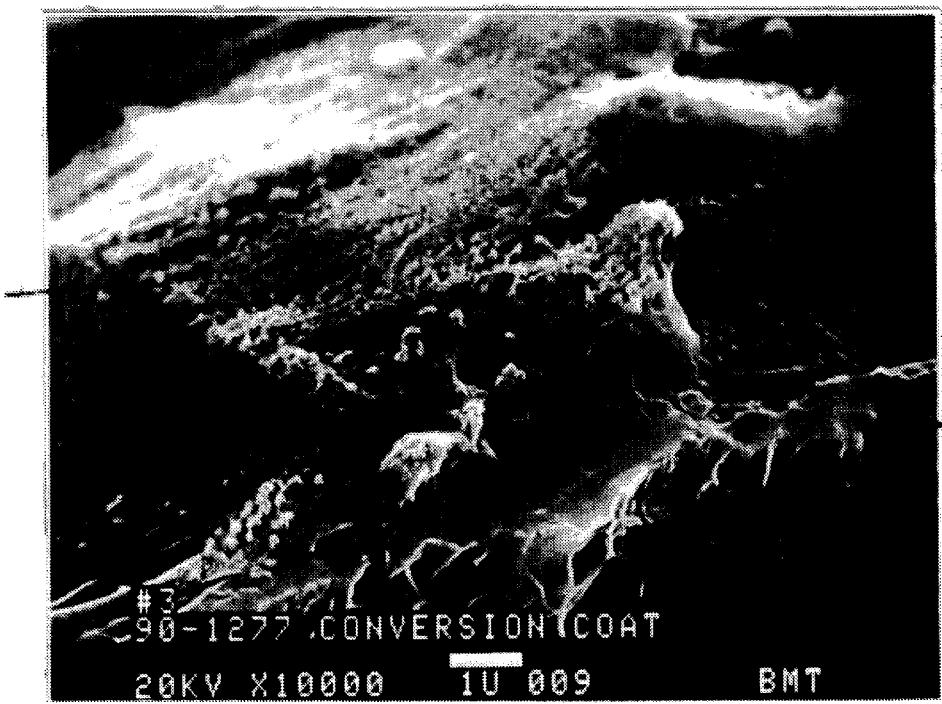
Figure 8:
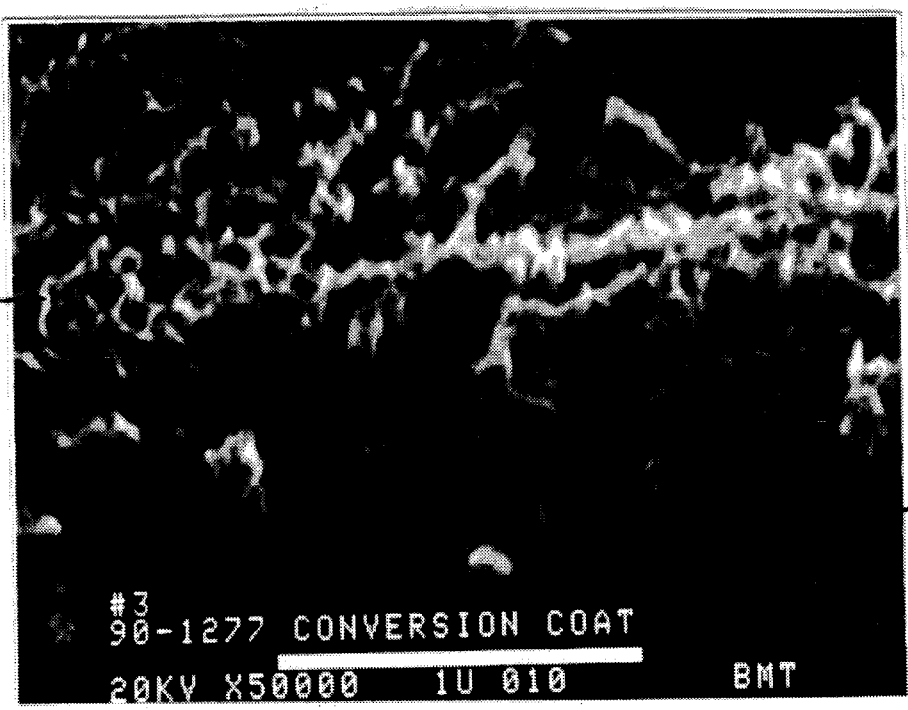
Figure 9:
Figure 10:
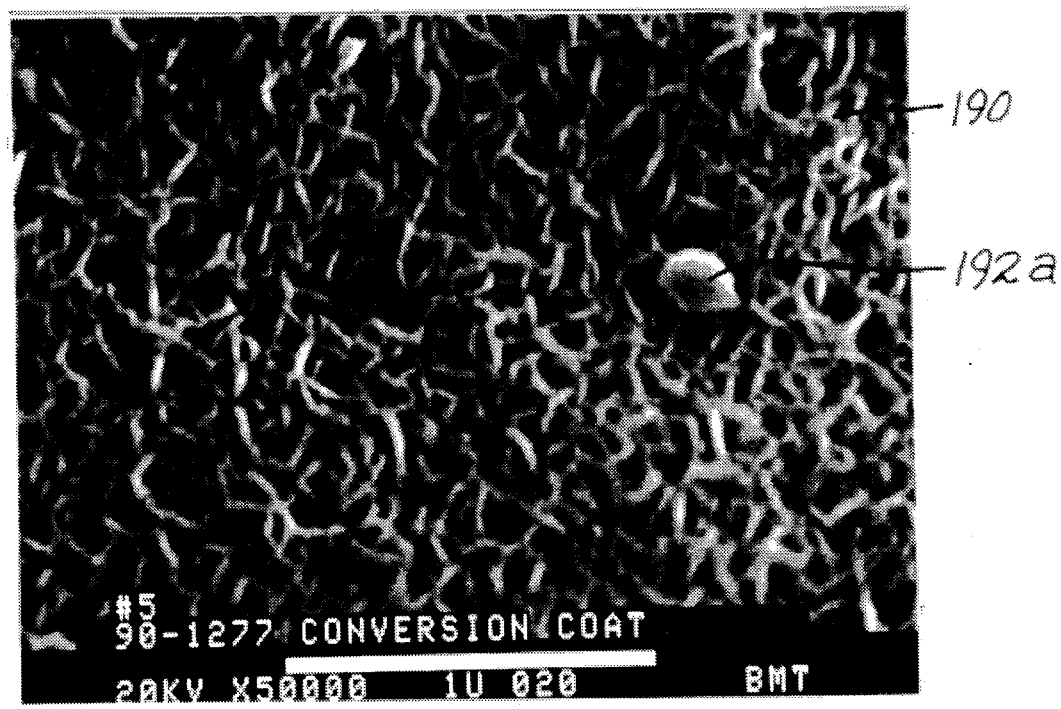
Figure 11:
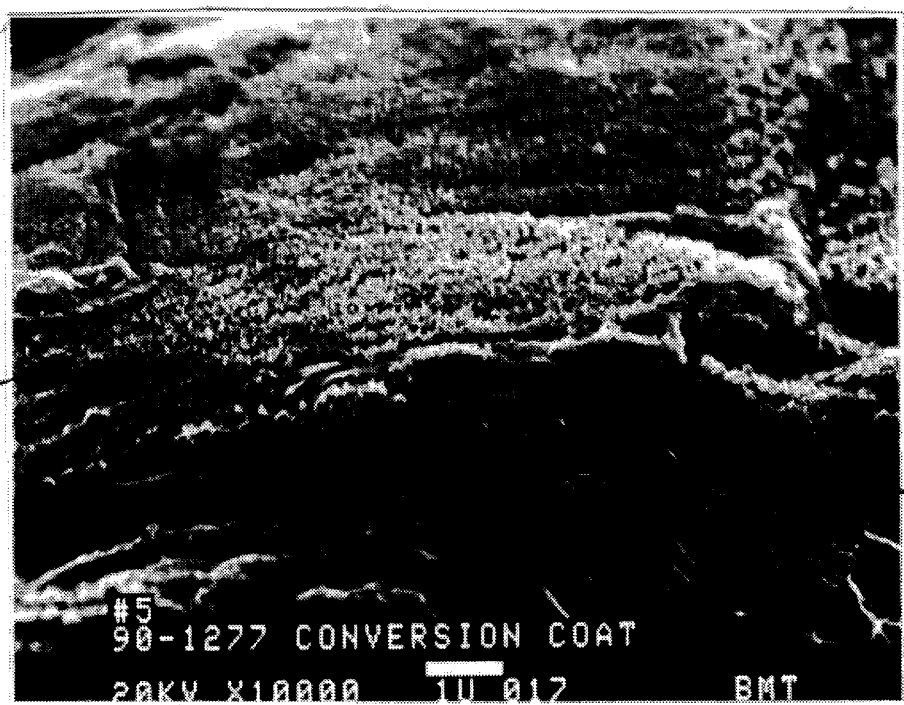
Figure 12:
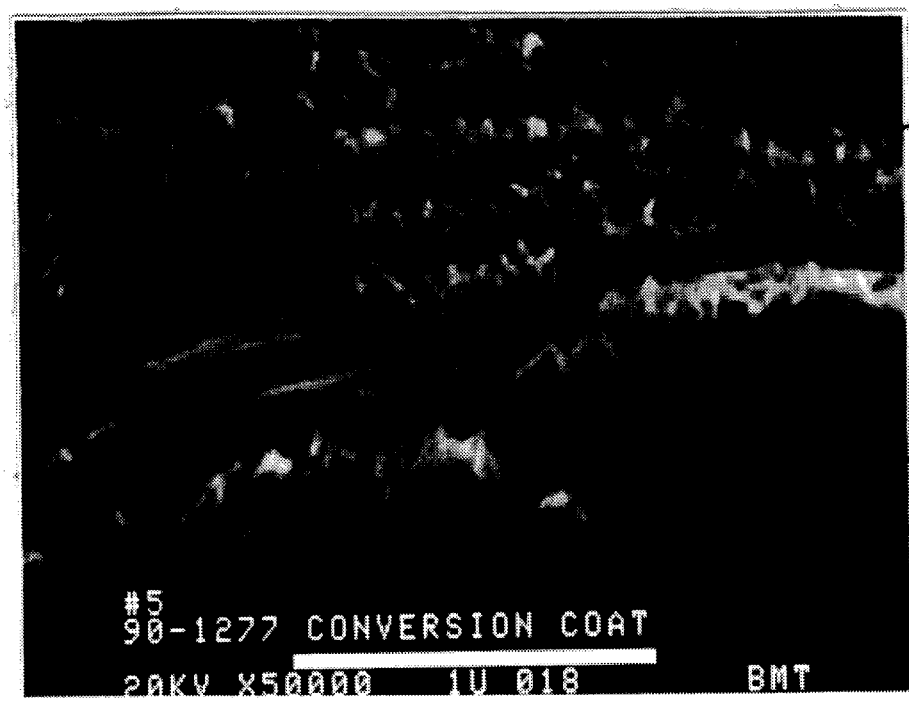
Figure 13:
Figure 14:
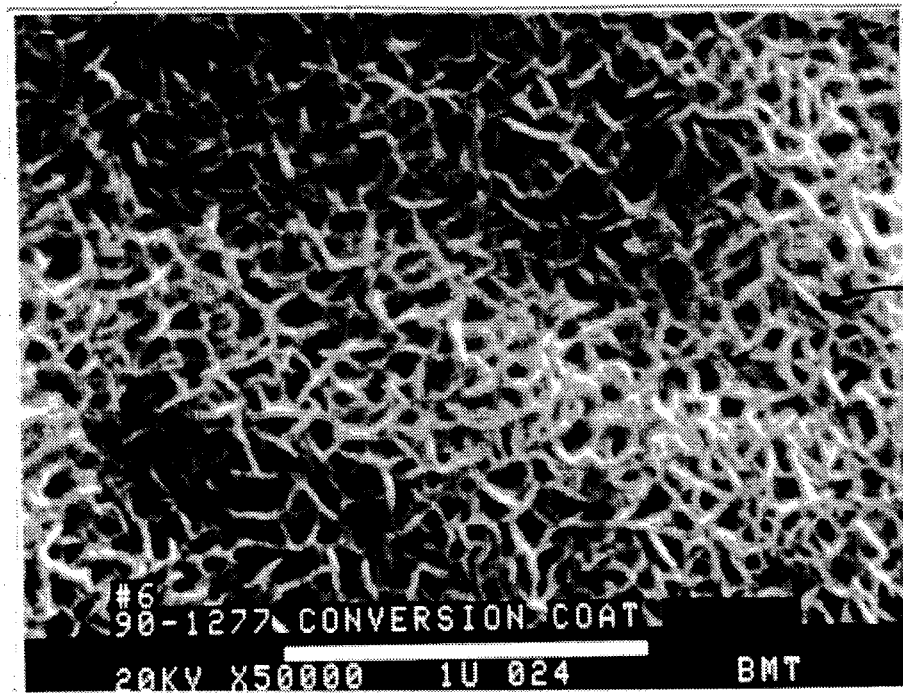
Figure 15:
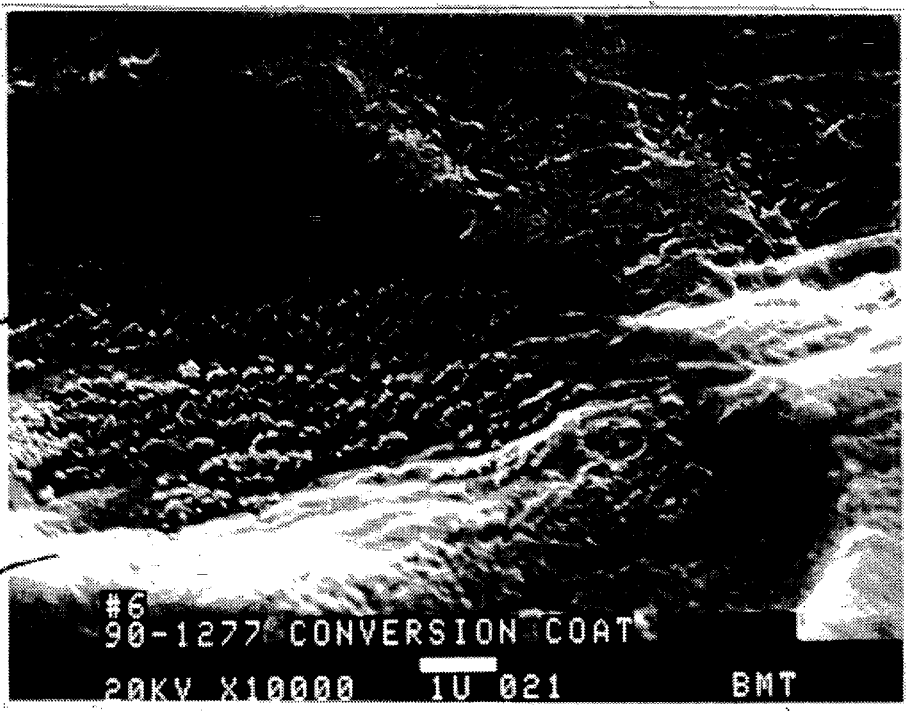
Figure 16:
Figure 17:

I have invented two classes of cobalt conversion coatings. The first class is a cobalt conversion coating consisting of an oxide structure in unsealed condition and suitable for use in service where paint adhesion is especially important. The second class is a cobalt conversion coating consisting of an oxide structure in sealed condition and suitable for use in service where bare metal corrosion resistance performance is desired.

A considerable amount of empirical research was conducted in order to arrive at the present invention. A variety of multivalent compounds was investigated, used either by themselves or in combination with alkalies, acids, or fluorides. Among these compounds were vanadates, molybdates, cerates, ferrates and a variety of borates. While film deposition of compounds containing these elements on aluminum alloy substrates has been achieved, none afforded any appreciable corrosion protection nor paint adhesion.

A significant increase in corrosion protection was observed, however, when aluminum substrates were immersed in aqueous solutions of simple cobalt-II ($Co^{2+}$) salts heated to 180° F. This led to an investigation of a number of cobalt-II and cobalt-III ($Co^{3+}$) reactions, in particular as described in copending application Ser. No. 07/525,800 filed May 17, 1990.

When 2-valent cobalt salts are dissolved into an aqueous solution of $MeNO_2$ (where Me= Na, K, or Li) (alkali metal ions), in the presence of an oxidizing agent, such as $H_2O_2$, then 3-valent cobalt nitrite complexes are formed:

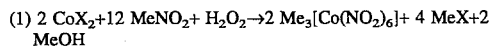

(1) $2\ CoX_2 + 12\ MeNO_2 + H_2O_2 \rightarrow 2\ Me_3[Co(NO_2)_6] + 4\ MeX + 2\ MeOH$ where $X_2= (NO_3)_2$, $Cl_2$, $(CH_3COO)_2$ (acetate), $SO_4$, $Br_2$, $(CN)_2$, $(SCN)_2$, $CO_3$. From an environmental standpoint, the cyanide and thiocyanate salts are not preferred. In particular, the following bath chemistries were prepared and tested:

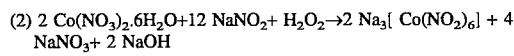

(2) $2\ Co(NO_3)_2 \cdot 6H_2O + 12\ NaNO_2 + H_2O_2 \rightarrow 2\ Na_3[Co(NO_2)_6] + 4\ NaNO_3 + 2\ NaOH$

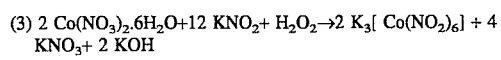

(3) $2\ Co(NO_3)_2 \cdot 6H_2O + 12\ KNO_2 + H_2O_2 \rightarrow 2\ K_3[Co(NO_2)_6] + 4\ KNO_3 + 2\ KOH$

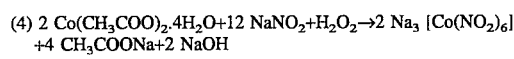

(4) $2\ Co(CH_3COO)_2 \cdot 4H_2O + 12\ NaNO_2 + H_2O_2 \rightarrow 2\ Na_3[Co(NO_2)_6] + 4\ CH_3COONa + 2\ NaOH$

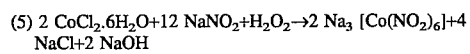

(5) $2\ CoCl_2 \cdot 6H_2O + 12\ NaNO_2 + H_2O_2 \rightarrow 2\ Na_3[Co(NO_2)_6] + 4\ NaCl + 2\ NaOH$ These 3-valent cobalt nitrite complexes were found to produce brightly iridescent oxide coatings on aluminum substrates.

The chemistry described in copending application Ser. No. 07/525,800 involved the chemistry of an aqueous solution containing a cobalt-II salt such as $CoX_2$ (where $X_2=Cl_2$, $Br_2$, $(NO_3)_2$, $(CN)_2$, $(SCN)_2$, $⅔PO_4$, $SO_4$, $(CH_3COO)_2$, $CO_3$) and the corresponding ammonium salt $NH_4X$ in the presence of ammonium hydroxide (ammonia) to form a cobalt-III hexammine coordination complex, for example:

$$4 CoX_2 + 4 NH_4X + 20 NH_3 \xrightarrow{O_2} 4 [Co(NH_3)_6]X_3 + \text{water} \quad (6)$$

It should be noted that the above cobalt hexammine chemistry in equation (6) involves a cobalt coordination complex where the portion of the complex which includes the ligand (the bracketed portion in equation (6)) is positively charged, i.e., (7) $[Co(NH_3)_6]^{3+}$ In the cobalt hexanitrite chemistry subsequently developed and described herein, cobalt coordination complexes are formed where the portion of the complex which includes the ligand (the bracketed portion in equations (1)–(5)) is negatively charged, i.e., (8) $[Co(NO_2)_6]^{3-}$ and the complete complex is (9) $Me_3[Co(NO_2)_6]$ where Me corresponds to Na, K, or Li (alkali metal ions).

This cobalt nitrite complex bath chemistry (equation (1)) has a distinct advantage over the previously described cobalt hexammine complex chemistry (equation (6)) in that pH control of the cobalt hexanitrite complex bath is not required.

It was discovered that when aluminum alloy substrates (such as alloy 2024-T3) are immersed in the above aqueous solution of reaction (1) containing the cobalt-III nitrite complexes, bright iridescent coatings are formed on the aluminum alloy, which give excellent corrosion resistance properties.

It is surprising that these reaction solutions contains cobalt-III hexanitrite complexes are capable of forming oxide structures on aluminum substrates. The oxidizing ability of the cobalt-III hexanitrite complex is believed to be responsible for the formation of the observed oxide films (which I refer to as "cobalt conversion coatings") on aluminum substrates. The formation of oxide structures has been confirmed by instrumental analysis (Auger analysis and electron microscopy) of the coating. The photomicrographs in FIGS. 1–20 illustrate the appearance of the cobalt conversion coating of the invention.

Initial bath formulations were made up using $Co(NO_3)_2.6H_2O$ and $NaNO_2$. Reaction quantities were used in accordance with stoichiometric amounts as shown in equation (2) above.

It became apparent during experimentation with this initial formulation that a number of parameters are important from the standpoint of bath chemistry and uniform formation of oxide coating films. These parameters are: chemical reactant selection; chemical reactant concentrations; bath makeup sequence; temperature; and immersion time. It should be noted that pH control is not a factor.

Chemical Reactant Selection

Regarding reactant selection, a wide variety of cobalt salts and metal nitrite salts are operable for cobalt complexing.

Among the cobalt-II salts which are operable in water solution are: cobalt nitrate, $Co(NO_3)_2.6H_2O$; cobalt chloride, $CoCl_2.6H_2O$; cobaltous sulfate, $CoSO_4$; cobaltous acetate, $Co(CH_3COO)_2.4H_2O$; and cobaltous basic carbonate, $2CoCO_3 \cdot Co(OH)_2.H_2O$. Each of the foregoing cobalt-II salts may be reacted with a nitrite salt such as $NaNO_2$, $KNO_2$, or $LiNO_2$.

Furthermore, other cobalt-II salts may be used if they possess a minimum solubility in water or in a water solution containing a metal nitrite salt.

It may also be noted that for aluminum and aluminum alloys the preferred reactants are $Co(NO_3)_2.6H_2O$ and $NaNO_2$, since cobalt nitrite complexes formed with potassium or lithium nitrite are of limited solubility and will eventually drop out of an aqueous solution.

A preferred chemical additive is an oxidizer, preferably hydrogen peroxide, $H_2O_2$. The function of the oxidizer is to oxidize the cobalt-II ions in solution to cobalt-III ions. Care must be taken that an excess amount of chemical oxidizer is not used because an excess would have the undesired effect of oxidizing the nitrite ions in solution to nitrate ions. The stream of air flowing into the tank functions as an oxidizer, so the presence of hydrogen peroxide is not essential for operability. The hydrogen peroxide increases the rate of oxidation of the cobalt-II ions in solution to cobalt-III ions and therefore is useful for commercial practice of the invention in that the solution becomes operational in a shorter period of time.

Furthermore, it may also be noted that a reaction accelerator chemical such as sodium bromide (NaBr) or sodium iodide (NaI) may be added to the solution. (NaI is preferred.) The reaction accelerator was found to have the effect of accelerating the formation of the oxide conversion coatings on aluminum alloy substrates as compared to solutions of cobalt-III hexanitrite complexes which did not contain this additive. The presence of the accelerator is not essential for operability. The accelerator increases the rate of formation of the oxide conversion coatings on aluminum alloys and therefore is useful for commercial practice of the invention.

Thus the preferred chemical reactants and additives are:

Cobalt nitrate $Co(NO_3)_2.6H_2O$

Sodium nitrite $NaNO_2$

Hydrogen peroxide (oxidizer) $H_2O_2$

Sodium iodide (accelerator) NaI

Chemical Reactant Concentration, pH, Temperature, and Immersion Time

With respect to chemical reactant concentrations, the concentration of dissolved cobalt-II salt used may be from about 0.1 moles per gallon of final solution up to the saturation limit of the cobalt-II salt employed. The concentration of dissolved metal nitrite salt may be from about 0.6 to 12 moles per gallon of final solution. The concentration of oxidizer, such as hydrogen peroxide, may be from complete omission up to about 0.5 moles per gallon of final solution. As stated above, an excess amount of hydrogen peroxide has undesired effects. The concentration of accelerator salt, such as NaI, may be from complete omission up to the solubility limit of the accelerator in the solution. The pH of the bath may be from about 7.0 to 7.2. The temperature of the bath may be from about 68° F. to 150° F.; below 100° F. coating formation is very slow; above 150° F. gradual decomposition of the cobalt-III hexanitrite complex occurs. The immersion time may be from about 3 minutes to 60 minutes.

Preferred Bath Preparation Sequence

1. A stainless steel tank fitted with air agitation plumbing and heating coils is filled to ¾ with deionized water at a temperature of 68° F. to 90° F. Air agitation is commenced to a gentle bubble. (The tank may be equipped with a filter unit to remove any solid impurities (dust, aluminum silt, etc.) during processing.)

2. A quantity of nitrite salt ($NANO_2$ is preferred) is added and completely dissolved. Stainless steel baskets may be used to hold the nitrite salt granules suspended in the water while dissolving. The preferred concentration of nitrite salt is about 3.6 moles per gallon of final solution. The amount used is based on the mole ratio of nitrite salt to cobalt salt which will produce an oxide coating exhibiting high paint adhesion properties. The preferred molar ratio of nitrite salt to cobalt salt is about 12 to 1.

3. A quantity of sodium iodide (the conversion coating reaction accelerator) may now be added. The concentration of this additive may be from no addition up to the solubility limit, however the preferred quantity is 80–100 gm per gallon of final solution.

4. The cobalt-II salt is now added and dissolved. The preferred concentration is about 0.3 moles per gallon of final solution. This concentration of the cobalt salt, when added to a solution already containing 3.6 moles per gallon of nitrite salt, achieves the preferred molar ratio of nitrite salt to cobalt salt of 12 to 1. Moderate air agitation is maintained.

5. A quantity of hydrogen peroxide $H_2O_2$ is now slowly added. The preferred amount is 0.3 to 0.5 moles of $H_2O_2$ (30 to 50 ml of $H_2O_2$ (30 volume %)) per gallon of final solution. The tank is filled to the final volume with deionized water. Air agitation of this solution is maintained for 12–16 hours at a temperature of 68°–90° F. and then the solution is heated to preferably 120°± 5° F. The use of $H_2O_2$ is preferred for fast and consistent cobalt-III hexanitrite complex formation. The solution is now ready for operation.

6. Optionally, a second stainless steel tank (to be used for a coating seal step) is prepared with air agitation plumbing and heating coils and is filled ¾ with deionized water. This post-cobalt conversion coating step serves as an oxide coating sealer to promote corrosion resistance performance. The tank is heated to 180°±5° F. with air agitation.

7. A quantity of ammonium nitrate, $NH_4NO_3$, is added to the seal tank and dissolved. The preferred amount is 114 gm (1.42 moles) per gallon of final solution. Stir as necessary to dissolve.

8. A quantity of nickel sulfate, $NiSO_4.6H_2O$, and a quantity of manganese acetate, $Mn(CH_3COO)_2.4H_2O$, are added to the seal tank and dissolved. The preferred amount of nickel sulfate is 152 gm (0.58 moles) per gallon of final solution. The preferred amount of manganese acetate is 76 gm (0.31 moles) per gallon of final solution. Stir as necessary to dissolve. 9. The seal tank is then filled to final volume with deionized water. No further air agitation is needed.

Preferred Overall Processing Sequences

The preferred overall processing sequences may be summarized as follows:

PROCESS SEQUENCE FLOW CHART

FOR MAXIMUM PAINT ADHESION (1) PRECLEAN IF REQUIRED
(2) MASK AND RACK AS REQUIRED
(3) ALKALINE CLEAN AND RINSE
(4) DEOXIDIZE AND RINSE
(5) FORM OXIDE COATING—15 MINUTES AT 125°± 5° F.
(6) IMMERSION RINSE—140° F., 5 MINUTES MINIMUM
(7) DRY—140° F. MAXIMUM

PROCESS SEQUENCE FLOW CHART

FOR MAXIMUM CORROSION RESISTANCE (1) PRECLEAN IF REQUIRED
(2) MASK AND RACK AS REQUIRED
(3) ALKALINE CLEAN AND RINSE
(4) DEOXIDIZE AND RINSE
(5) FORM OXIDE COATING—30 MINUTES AT 125°± 5° F.
(6) IMMERSION RINSE—140° F., 5 MINUTES MINIMUM
(7) SEAL AS REQUIRED
(8) RINSE—ROOM TEMPERATURE, 3 MINUTES MINIMUM
(9) DRY—140° F. MAXIMUM

General Notes with Respect to the Above Process Flow Charts

The cobalt conversion coating should be applied after all trimming and fabrication have been completed. Parts, where solution entrapment is possible, should not be subjected to immersion alkaline cleaning or immersion deoxidizing; manual cleaning and manual deoxidizing procedures should be used to obtain water break-free surfaces before applying cobalt conversion treatment. A water break-free surface is a surface which maintains a continuous water film for a period of at least 30 seconds after having been sprayed or immersion rinsed in clean water at a temperature below 100° F.

Thorough rinsing and draining throughout processing is necessary as each solution should be completely removed to avoid interference with the performance of the next solution in the sequence. Parts should be processed from one step to the next without delay and without allowing the parts to dry. When it is necessary to handle wet parts, wear clean latex rubber gloves. After conversion coating, handle dry parts only with clean fabric gloves. For processing systems which require part clamping, the number and size of contact points should be kept to a minimum as necessary for adequate mechanical support.

Precleaning

Vapor degrease may be performed in accordance with Boeing Process Specification BAC 5408, emulsion clean in accordance with Boeing Process Specification BAC 5763, or solvent clean in accordance with Boeing Process Specification BAC 5750 if parts are greasy or oily. Parts with open faying surfaces or spot-welded joints where solution entrapment is possible should be immersed in cold water (or in hot and cold water) for 2 minutes after precleaning.

Masking and Racking

Areas which do not require cobalt conversion coatings should be masked with maskants. Dissimilar metal inserts (except chromium, nickel or cobalt alloy or plating, CRES, or titanium) and non-aluminum coated plasma flame sprayed area should be masked off.

Alkaline Cleaning

Alkaline clean and rinse may be performed in accordance with Boeing Process Specification BAC 5744 or Boeing Process Specification BAC 5749 except for parts with open faying surfaces or spot welded joints, in which case, rinsing should be for at least 10 minutes using agitation with multiple immersions (a minimum of four times) followed by manual spray rinsing as required to prevent solution entrapment.

Deoxidizing

Deoxidize and rinse may be performed in accordance with Boeing Process Specification BAC 5765 except for parts where solution entrapment is possible, which parts may be rinsed using the method described above under "Alkaline Cleaning". Castings may be deoxidized by either of the following methods:

a. Deoxidize in accordance with Boeing Process Specification BAC 5765, Solution 37, 38 or 39.

b. Dry abrasive blast castings in accordance with Boeing Process Specification BAC 5748, Type II, Class 1 and rinse.

EXAMPLES

Examples of specific solution formulations within the scope of the invention are as follows:

Example 1

| Component | Make-Up Per Gallon Of Final Solution | Control Limits |
|---|---|---|
| Cobalt(ous) nitrate, $CO(NO_3)_2.6H_2O$ (hexahydrate) | 85 gm (about 0.29 mole) | 75–95 gm/gal |
| Sodium nitrite, $NaNO_2$ | 242 gm (about 3.51 moles) | 227–246 gm/gal |
| Sodium Iodide, NaI | 90 gm (about 0.60 moles) | 83–99 gm/gal |
| Hydrogen peroxide, $H_2O_2$ (30 vol. %) | 30–50 ml (about 0.3–0.5 moles of $H_2O_2$) | |
| Water | balance | |
| Temperature | | 120 ± 5° F. |
| pH | | 7.0–7.2 |

The formulation of Example 1, with a molar ratio of nitrite salt to cobalt salt of about 12 to 1, is useful for producing oxide coatings exhibiting high paint adhesion in unsealed condition.

Example 2

| Component | Make-Up Per Gallon Of Final Solution | Control Limits |
|---|---|---|
| Cobalt(ous) chloride, $CoCl_2.6H_2O$ (hexahydrate) | 69 gm (about 0.29 mole) | |
| Sodium nitrite, $NaNO_2$ | 242 gm (about 3.51 moles) | |
| Sodium iodide, NaI | 90 gm | |

| Component | Make-Up Per Gallon Of Final Solution | Control Limits |
|---|---|---|
| Hydrogen peroxide, $H_2O_2$ (30 vol. %) | (about 0.60 moles) 30–50 ml (about 0.3–0.5 moles of $H_2O_2$) | |
| Water | balance | |
| Temperature | | 120–150° F. |
| pH | | 7.0–7.2 |

The formulation of Example 2, also having a molar ratio of nitrite salt to cobalt salt of about 12 to 1, is useful for producing oxide coatings possessing high paint adhesion properties in unsealed condition.

Example 3

| Component | Make-Up Per Gallon Of Final Solution | Control Limits |
|---|---|---|
| Cobalt acetate, $CO(CH_3COO)_2.4H_2O$ | 73 gm (about 0.29 moles) | |
| Sodium nitrite, $NaNO_2$ | 242 gm (about 3.51 moles) | |
| Sodium iodide, NaI (accelerator) | 90 gm (about 0.60 moles) | |
| Hydrogen peroxide, $H_2O_2$ (30 vol. %) | 30–50 ml (about 0.3–0.5 moles of $H_2O_2$) | |
| Water | balance | |
| Temperature | | 120–150° F. |
| pH | | 7.0–7.2 |

It should be noted that in all of the above examples hydrogen peroxide $H_2O_2$ (30 vol. %) is employed to convert the 2-valent cobalt salt into the 3-valent cobalt hexanitrite complex. While air bubbling (aeration) of the solution alone will convert a sufficient quantity of cobalt-II salt to cobalt-III complex, the procedure will be time consuming and complete conversion may never be obtained.

In principle, any 2-valent soluble cobalt salt may be reacted with any soluble nitrite salt to form 3-valent cobalt hexanitrite complexes. Furthermore, this type of complexing, as shown in formula (8) above, is not restricted to nitrites only. For research purposes, cyanide salts were used (i.e., sodium cyanide, NaCN) to form hexacyano complexes of the type shown below

(10) 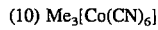

and have yielded satisfactory conversion coatings on aluminum alloys. However, cyanide complexes will not be used because of environmental considerations.

As mentioned above, in order to produce cobalt conversion coatings with maximum corrosion resistance performance (168 hrs. salt spray corrosion resistance, when tested in accordance with ASTM B117) it is necessary to subject the cobalt conversion coating to a sealing step. For this purpose, a number of sealing solutions were found to be useful, however, the sealing solution formulation below is preferred.

Example 4

| Component | Make-Up Per Gallon Of Final Solution | Control Limits |
| --- | --- | --- |
| Nickel sulfate, NiSO$_4$.6H$_2$O (hexahydrate) | 152 gm (about 0.58 moles) | 144–159 gm |
| Ammonium nitrate, NH$_4$NO$_3$ | 114 gm (about 1.42 moles) | 105–121 gm |
| Manganese acetate, Mn(CH$_3$COO)$_2$.4H$_2$O | 76 gm (about 0.31 moles) | 68–84 gm |
| Operating temperature | | 185 ± 5° F. |

Figure 18:
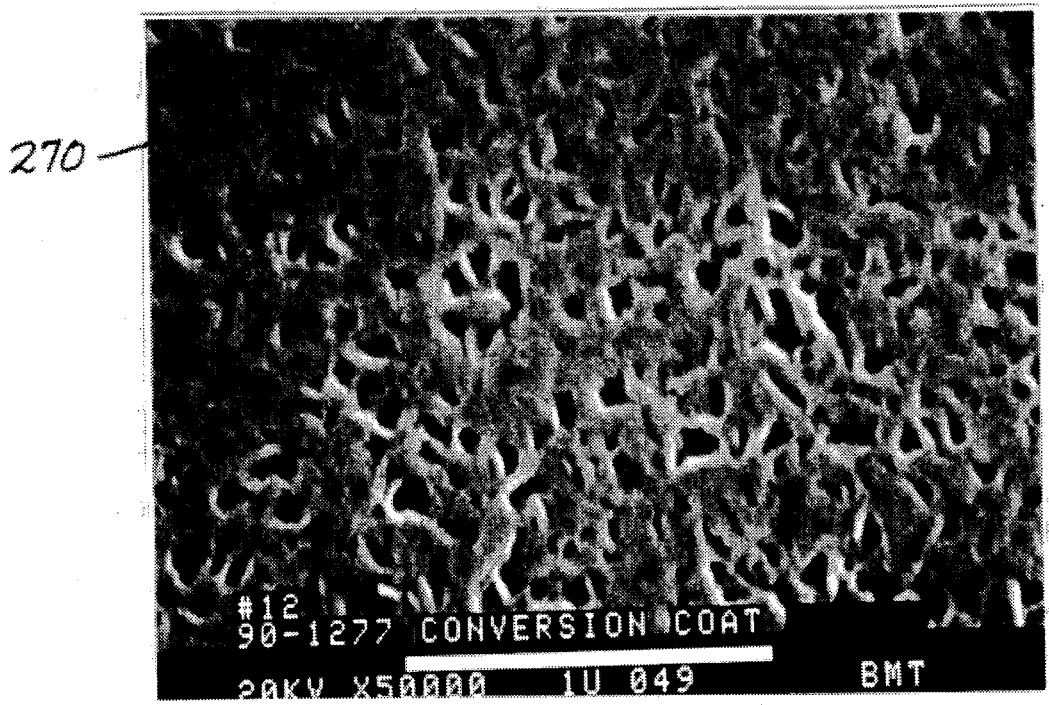
Figure 19:
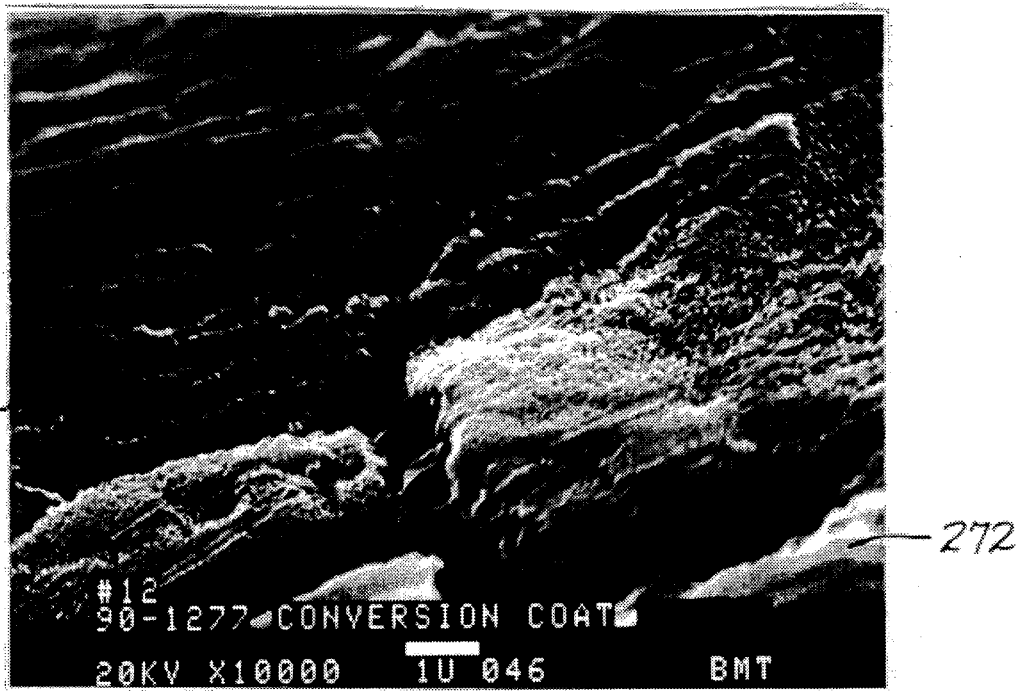
Figure 20:

The immersion time in the sealing solution may be about 10–30 minutes, with 15 minutes being preferred. The sealing solution is believed to seal the cobalt conversion coating by a hydration mechanism. FIGS. 17–20, particularly FIG. 18, show a sealed cobalt conversion coating 270. Other sealing solutions which may be employed are as follows:

Solution 1: Boric acid, H$_3$BO$_3$, 50 gm/gal. Cobalt sulfate, CoSO$_4$.7H$_2$O, 25 gm/gal. Ammonium acetate, CH$_3$COONH$_4$, 25 gm/gal.

Solution 2: Boric acid, H$_3$BO$_3$, 30 gm/gal. Sodium borate, Na$_2$B$_4$O$_7$, 30 gm/gal. Sodium nitrite, NaNO$_2$, 30 gm/gal. Ammonium vanadate, NH$_4$VO$_3$, 5 gm/gal.

Solution 3: Cobalt sulfate, CoSO$_4$.7H$_2$O, 25 gm/gal. Ammonium vanadate, NH$_4$VO$_3$, 5 gm/gal. Boric acid, H$_3$BO$_3$, 50 gm/gal.

Solutions 1–3 are not preferred because they lose their effectiveness over a period of time, whereas the solution in Example 4 has a long life.

Cobalt Conversion Coating: Solution Temperature and Immersion Time

The two process parameters of solution temperature and immersion time have been found to be important as relating to cobalt conversion coating performance.

A continuous operating temperature range of the cobalt conversion tank of 120°–140° F. yields optimum results with respect to coating performance on aluminum alloy substrates. Optimum paint adhesion is obtained when the tank is operated at or near 120° F., while optimum corrosion resistance performance is given at 140° F. in combination with the subsequent seal process. Immersion times in the cobalt conversion tank have an effect on the oxide coating thickness as measured by the coating weight (in unsealed condition) ranging from 40 to 60 mg/ft$^2$. An optimum immersion time for maximum paint adhesion is 15 minutes and for maximum corrosion resistance performance is 30 minutes.

Corrosion Resistance

Salt spray corrosion resistance of cobalt conversion coatings produced by the above processes varies over a wide range, depending on reactant selection, immersion times, and bath operating temperatures. Preferred results are obtained when the formulation of Example 1 is utilized at immersion times of 30 minutes. In this way, sealed oxide coatings have been produced with 168 hrs. of salt spray corrosion resistance when sealed with the seal solution as described herein and tested in accordance with ASTM B117.

Paint Adhesion

Paint adhesion tests were conducted using aircraft paints qualified to Boeing Material Specification BMS 10-11 (a highly crosslinked epoxy primer) and BMS 10-60 (a highly crosslinked urethane topcoat). General trends observed with the present cobalt conversion coatings are consistent with conventional chromic acid conversion coatings, i.e., corrosion resistance and paint adhesion performance properties have an inverse relationship. In general, where corrosion resistance is at a maximum, paint adhesion is at a minimum, and vice versa.

However, the optional post-conversion step consisting of immersion into a heated solution (at 185°± 5° F.) of NiSO$_4$/NH$_4$NO$_3$/Mn-acetate minimizes this problem by maintaining sufficient paint adhesion values while maintaining high corrosion resistance properties.

Oxide Coating Analyses

ESCA surface analysis, using a Perkin-Elmer Model 550 surface analyzer, and Auger oxide profiles, using the same machine (in a different operating mode), have been performed in order to characterize the cobalt conversion coatings of the invention. (ESCA= electron spectroscopy for chemical analysis (also known as XPS or X-ray photoelectron spectroscopy).)

These analyses show that the cobalt conversion coating consists of a mixture of oxides, namely, aluminum oxide, Al$_2$O$_3$, as the largest volume percent, and cobalt oxides, CoO, Co$_3$O$_4$, and Co$_2$O$_3$. The term "largest volume percent" means that the volume of this oxide exceeds the volume of any other oxide which is present, but the term "largest volume percent" does not necessarily imply that the volume of this oxide is more than 50 volume percent.

The data further shows that in the lower portion of the oxide coating (that is, next to the aluminum substrate), the largest volume percent is Al$_2$O$_3$. The middle portion of the oxide coating is a mixture of CoO, Co$_3$O$_4$, Co$_2$O$_3$, and Al$_2$O$_3$. And the data shows that in the top portion of the oxide coating, the largest volume percent is a mixture of Co$_3$O$_4$ and Co$_2$O$_3$.

Additional characterization of the cobalt conversion coatings of the invention may be found above in the "Brief Description Of The Drawings", in FIGS. 1–20, and in the descriptions of FIGS. 1–20. FIGS. 1–4 show a cobalt conversion coating 130 (in the unsealed condition) formed by a 20 minute immersion in a typical cobalt conversion coating solution. FIGS. 5–8 show a cobalt conversion coating 150 (in the unsealed condition) formed by a 30 minute immersion in a typical cobalt conversion coating solution. FIGS. 9–12 show a cobalt conversion coating 190 (in the unsealed condition) formed by a 50 minute immersion in a typical cobalt conversion coating solution. FIGS. 13–16 show a cobalt conversion coating 230 (in the unsealed condition) formed by a 60 minute immersion in a typical cobalt conversion coating solution. Comparing FIGS. 1–4, FIGS. 5–8, FIGS. 9–12, and FIGS. 13–16, there does not appear to be any significant structural difference between coating 130, coating 150, coating 190, and coating 230. This suggests that at any given bath operating temperature, the oxide coating becomes self limiting. The top surface of the cobalt conversion coating, as shown in FIGS. 1, 2, 5, 6, 9, 10, 13, and 14 is porous and bears a resemblance to chow mein noodles. This oxide structure provides appreciable surface area and porosity for good paint adhesion.

FIGS. 17–20 show sealed cobalt conversion coating 270. The cobalt conversion coating was formed on the substrate and then the coating was partially sealed by immersion in a sealing solution. In particular, FIG. 18 shows the partially sealed structure of coating 270. Sealed oxide coating 270 is not as porous as an unsealed oxide coating, the pores of the oxide coating being partially filled by hydration as a result of immersion in a sealing solution. The partial sealing of the oxide coating gives reduced paint adhesion results, but excellent corrosion resistance performance.

Other Methods of Application

The above examples illustrate producing cobalt conversion coatings by immersion application. The same principles apply to producing the conversion coating by manual application and by spray application.

The patents, specifications, and other publications referenced above are incorporated herein by reference.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process for forming an oxide film cobalt conversion coating exhibiting corrosion resistance and paint adhesion properties on a metal substrate, wherein said substrate is aluminum, aluminum alloy, magnesium, magnesium alloy, a Cd plated substrate, or a Zn plated substrate, said process comprising the steps of:
   (a) providing an oxide film forming cobalt conversion solution comprising an aqueous reaction solution comprising a soluble cobalt-III hexacoordinated complex, wherein said cobalt-III hexacoordinated complex is present in the form of $Me_3[Co(NO_2)_6]$ wherein Me is one or more selected from the group consisting of Na, K, and Li, and the concentration of said cobalt-III hexacoordinated complex is from about 0.1 mole per gallon of solution to the saturation limit of said cobalt-III hexacoordinated complex, and wherein said aqueous reaction solution has a pH of about 7.0 to 7.2; and
   (b) contacting said metal substrate with said solution for a sufficient amount of time to oxidize the surface of said substrate, whereby said oxide film cobalt conversion coating is formed, thereby imparting corrosion resistance and paint adhesion properties to said substrate.

2. The process of claim 1 wherein said cobalt conversion solution has a temperature of about 68° F. to 150° F.

3. The process of claim 1 wherein said substrate is contacted with said cobalt conversion solution for a time of about 3 minutes to 60 minutes.

4. A process for forming an oxide film cobalt conversion coating exhibiting corrosion resistance and paint adhesion properties on a metal substrate, wherein said substrate is aluminum, aluminum alloy, magnesium, magnesium alloy, a Cd plated substrate, or a Zn plated substrate, said process comprising the steps of:
   (a) providing an oxide film forming cobalt conversion solution comprising an aqueous reaction solution comprising a soluble cobalt-III hexanitrite complex, wherein said cobalt-III hexanitrite complex is present in the form of $Me_3[Co(NO_2)_6]$ wherein Me is one or more selected from the group consisting of Na, K, and Li, and wherein said cobalt-III hexanitrite complex was made by reacting a cobalt-II salt with an alkali metal nitrite such that the concentration of said cobalt-III hexanitrite complex is from about 0.1 mole per gallon of solution to the saturation limit of said cobalt-III hexanitrite complex, and wherein said aqueous reaction solution has a pH of about 7.0 to 7.2; and
   (b) contacting said metal substrate with said solution for a sufficient amount of time to oxidize the surface of said substrate, whereby said oxide film cobalt conversion coating is formed, thereby imparting corrosion resistance and paint adhesion properties to said substrate.

5. The process of claim 4 wherein said cobalt conversion solution has a temperature of about 68° F. to 150° F.

6. The process of claim 4 wherein said substrate is contacted with said cobalt conversion solution for a time of about 3 minutes to 60 minutes.

7. A process for forming an oxide film cobalt conversion coating exhibiting corrosion resistance and paint adhesion properties on a substrate, wherein said substrate is aluminum or aluminum alloy, said process comprising the steps of:
   (a) providing an oxide film forming cobalt conversion solution comprising an aqueous reaction solution comprising a soluble cobalt-III hexacoordinated complex, wherein said cobalt-III hexacoordinated complex is present in the form of $Me_3[Co(NO_2)_6]$ wherein Me is one or more selected from the group consisting of Na, K, and Li, and the concentration of said cobalt-III hexacoordinated complex is from about 0.1 mole per gallon of solution to the saturation limit of said cobalt-III hexacoordinated complex; and
   (b) contacting said metal substrate with said solution for a sufficient amount of time to oxidize the surface of said substrate, whereby said oxide film cobalt conversion coating is formed, thereby imparting corrosion resistance and paint adhesion properties to said substrate.

8. The process of claim 7 wherein said cobalt conversion solution has a pH of about 7.0 to 7.2.

9. The process of claim 7 wherein said cobalt conversion solution has a temperature of about 68° F. to 150° F.

10. The process of claim 7 wherein said substrate is contacted with said cobalt conversion solution for a time of about 3 minutes to 60 minutes.

11. A process for forming an oxide film cobalt conversion coating exhibiting corrosion resistance and paint adhesion properties on a substrate, wherein said substrate is aluminum or aluminum alloy, said process comprising the steps of:
   (a) providing an oxide film forming cobalt conversion solution comprising an aqueous reaction solution prepared by reacting a cobalt-II salt with an alkali metal nitrite salt, wherein the concentration of said cobalt-II salt is from about 0.1 moles per gallon of final solution to the saturation limit of the cobalt-II salt employed and the concentration of said alkali metal nitrite salt is from about 0.6 to 12 moles per gallon of final solution; and
   (b) contacting said substrate with said solution for a sufficient amount of time to oxidize the surface of said substrate, whereby said oxide film cobalt conversion coating is formed, thereby imparting corrosion resistance and paint adhesion properties to said substrate.

12. The process of claim 11 wherein said cobalt-II salt is a cobalt-II salt which has a minimum solubility of about 25 grams per 100 ml of water at 20° C. (68° F.) or a minimum solubility of about 25 grams per 100 ml of water solution containing a metal nitrite salt at 20° C. (68° F.).

13. The process of claim 11 wherein said cobalt-II salt is $CoX_2$ wherein $X_2$ is one or more selected from the group consisting of $(NO_3)_2$, $Cl_2$, $(CH_3COO)_2$ (acetate), $SO_4$, $Br_2$, $(CN)_2$, $(SCN)_2$, or $CO_3$.

14. The process of claim 11 herein said metal nitrite salt is $MeNO_2$ wherein Me is one or more selected from the group consisting of Na, K, or Li.

15. The process of claim 11 wherein an oxidizer is added to said cobalt conversion solution to oxidize the cobalt-II ions in solution to cobalt-III ions.

16. The process of claim 15 wherein said oxidizer is hydrogen peroxide, $H_2O_2$.

17. The process of claim 11 wherein a reaction accelerator is added to said cobalt conversion solution to accelerate the formation of said cobalt conversion coating on said substrate.

18. The process of claim 17 wherein said reaction accelerator is selected from the group consisting of sodium iodide, NaI, or sodium bromide, NaBr.

19. The process of claim 11 wherein said cobalt conversion solution is prepared by a bath makeup sequence comprising:

(a) adding and dissolving said metal nitrite salt;

(b) then adding and dissolving a reaction accelerator selected from the group consisting of sodium iodide, NaI, or sodium bromide, NaBr;

(c) then adding and dissolving said cobalt-II salt; and (d) then adding hydrogen peroxide, $H_2O_2$, to the solution.

20. The process of claim 11 wherein said solution is prepared by reacting said cobalt-II salt with said metal nitrite salt, wherein the molar ratio of said metal nitrite salt to cobalt salt is about 6 to 1 to 14 to 1.

21. The process of claim 11 wherein said cobalt conversion solution has a pH of about 7.0 to 7.2.

22. The process of claim 11 wherein said cobalt conversion solution has a temperature of about 68° F. to 150° F.

23. The process of claim 11 wherein said substrate is contacted with said cobalt conversion solution for a time of about 3 minutes to 60 minutes.

24. The process of claim 11 comprising the additional step of contacting said coated substrate with an aqueous sealing solution comprising nickel sulfate, $NiSO_4.6H_2O$, ammonium nitrate, $NH_4NO_3$, and manganese acetate, $Mn(CH_3COO)_2.4H_2O$.

25. An article produced by the process of claim 11.

26. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting cobalt nitrate, $Co(NO_3)_2.6H_2O$, with sodium nitrite, $NaNO_2$, wherein the concentration of said cobalt nitrate is from about 75 to 95 grams per gallon of final solution and the concentration of said sodium nitrite is from about 227 to 246 grams per gallon of final solution; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

27. The process of claim 26 wherein hydrogen peroxide, $H_2O_2$, in the amount of 0.3 to 0.5 moles per gallon of final solution is added to said cobalt conversion solution to oxidize the cobalt-II ions in solution to cobalt-III ions.

28. The process of claim 26 wherein sodium iodide, NaI, in the amount of 83 to 99 grams per gallon of final solution is added to said cobalt conversion solution to accelerate the formation of said cobalt conversion coating on said substrate.

29. The process of claim 26 wherein said cobalt conversion solution is prepared by a bath makeup sequence comprising;

(a) adding and dissolving said sodium nitrite;

(b) then adding and dissolving sodium iodide, NaI;

(c) then adding and dissolving said cobalt nitrate; and (d) then adding said hydrogen peroxide, $H_2O_2$, to the solution.

30. The process of claim 26 wherein said cobalt conversion solution has a pH of about 7.0 to 7.2.

31. The process of claim 26 wherein said cobalt conversion solution has a temperature of about 120°±5° F.

32. The process of claim 26 wherein said substrate is contacted with said cobalt conversion solution for a time of about 15 minutes to 30 minutes.

33. The process of claim 26 comprising the additional step of contacting said coated substrate with an aqueous sealing solution comprising nickel sulfate, $NiSO_4.6H_2O$, ammonium nitrate, $NH_4NO_3$, and manganese acetate, $Mn(CH_3COO)_2.4H_2O$.

34. An article produced by the process of claim 26.

35. A chemical conversion coating solution for producing a cobalt conversion coating on a metal substrate, said solution comprising an aqueous reaction solution of a soluble cobalt-III hexacoordinated complex, wherein said cobalt-III hexacoordinated complex is present in the form of $Me_3[Co(NO_2)_6]$ wherein Me is one or more selected from the group consisting of Na, K, and Li, the concentration of said cobalt-III hexacoordinated complex being from about 0.1 mole per gallon of solution to the saturation limit of said cobalt-III hexacoordinated complex, and wherein said cobalt conversion solution has a pH of about 7.0 to 7.2.

36. A chemical conversion coating solution for producing a cobalt conversion coating on a metal substrate, said solution comprising:

(a) an aqueous reaction solution of a soluble cobalt-III hexanitrite complex, the concentration of said cobalt-III hexanitrite complex being from about 0.1 mole per gallon of solution to the saturation limit of said cobalt-III hexanitrite complex, and wherein said aqueous reaction solution has a pH of about 7.0 to 7.2;

(b) wherein said aqueous reaction solution is prepared by reacting a cobalt-II salt with a metal nitrite salt, wherein the concentration of said cobalt-II salt is from about 0.1 moles per gallon of final solution to the saturation limit of the cobalt-II salt employed and the concentration of said metal nitrite salt is from about 0.6 to 12 moles per gallon of final solution.

37. The solution of claim 36 wherein said cobalt-II salt is $CoX_2$ wherein $X_2$ is one or more selected from the group consisting of $(NO_3)_2$, $Cl_2$, $(CH_3COO)_2$ (acetate), $SO_4$, $Br_2$, $(CN)_2$, $(SCN)_2$, or $CO_3$.

38. The solution of claim 36 wherein said metal nitrite salt is $MeNO_2$ wherein Me is one or more selected from the group consisting of Na, K, or Li.

39. The solution of claim 36 wherein said cobalt conversion solution is prepared by a bath makeup sequence comprising the steps of:

(a) adding and dissolving said metal nitrite salt;

(b) then adding and dissolving a reaction accelerator selected from the group consisting of sodium iodide, NaI, or sodium bromide, NaBr;

(c) then adding and dissolving said cobalt-II salt; and (d) then adding hydrogen peroxide, $H_2O_2$, to the solution.

40. The solution of claim 36 wherein said solution is prepared by reacting said cobalt-II salt with said metal nitrite salt, wherein the molar ratio of nitrite salt to cobalt salt is about 6 to 1 to 14 to 1.

41. The solution of claim 36 wherein an oxidizer is added to said solution to oxidize the cobalt-II ions to cobalt-III ions.

42. The solution of claim 41 wherein said oxidizer is hydrogen peroxide, $H_2O_2$.

43. The solution of claim 36 wherein a reaction accelerator is added to said cobalt conversion solution to accelerate the formation of said cobalt conversion coating on said substrate.

44. The solution of claim 43 wherein said reaction accelerator is selected from the group consisting of sodium iodide, NaI, or sodium bromide, NaBr.

45. The solution of claim 36 wherein said solution has a temperature of about 68° F. to 150° F.

46. A chemical conversion coating solution for producing a cobalt conversion coating on a substrate, wherein said substrate is aluminum or aluminum alloy, said solution comprising an aqueous reaction solution of a soluble cobalt-III hexacoordinated complex, wherein said cobalt-III hexacoordinated complex is present in the form of $Me_3[Co(NO_2)_6]$ wherein Me is one or more selected from the group consisting of Na, K, and Li, the concentration of said cobalt-III hexacoordinated complex being from about 0.1 mole per gallon of solution to the saturation limit of said cobalt-III hexacoordinated complex.

47. A chemical conversion coating solution for producing a cobalt conversion coating on a substrate, wherein said substrate is aluminum or aluminum alloy, said solution comprising:

(a) an aqueous reaction solution of a soluble cobalt-III hexanitrite complex, the concentration of said cobalt-III hexanitrite complex being from about 0.1 mole per gallon of solution to the saturation limit of said cobalt-III hexanitrite complex;

(b) wherein said reaction solution is prepared by reacting a cobalt-II salt with a metal nitrite salt, wherein the concentration of said cobalt-II salt is from about 0.1 moles per gallon of final solution to the saturation limit of the cobalt-II salt employed and the concentration of said metal nitrite salt is from about 0.6 to 12 moles per gallon of final solution.

48. The solution of claim 47 wherein said cobalt-II salt is $CoX_2$ wherein $X_2$ is one or more selected from the group consisting of $(NO_3)_2$, $Cl_2$, $(CH_3COO)_2$ (acetate), $SO_4$, $Br_2$, $(CN)_2$, $(SCN)_2$, or $CO_3$.

49. The solution of claim 47 wherein said metal nitrite salt is $MeNO_2$ wherein Me is one or more selected from the group consisting of Na, K, or Li.

50. The solution of claim 47 wherein said cobalt-III hexanitrite complex is present in the form of $Me_3[Co(NO_2)_6]$ wherein Me is one or more selected from the group consisting of Na, K, and Li.

51. The solution of claim 47 wherein said cobalt conversion solution is prepared by a bath makeup sequence comprising the steps of:

(a) adding and dissolving said metal nitrite salt;

(b) then adding and dissolving a reaction accelerator selected from the group consisting of sodium iodide, NaI, or sodium bromide, NaBr;

(c) then adding and dissolving said cobalt-II salt; and (d) then adding hydrogen peroxide, $H_2O_2$, to the solution.

52. The solution of claim 47 wherein said solution is prepared by reacting said cobalt-II salt with said metal nitrite salt, wherein the molar ratio of said metal nitrite salt to cobalt salt is about 6 to 1 to 14 to 1.

53. The solution of claim 47 wherein said solution has a pH of about 7.0 to 7.2.

54. The solution of claim 47 wherein said solution has a temperature of about 68° F. to 150° F.

55. The solution of claim 47 wherein said cobalt-III hexanitrite complex is sodium cobalt-III hexanitrite complex, said cobalt-II salt is cobalt-II nitrate, said metal nitrite salt is sodium nitrite, and said solution has a temperature of about 120°± 5° F.

56. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting cobalt chloride, $CoCl_2.6H_2O$, with sodium nitrite, $NaNO_2$, wherein the concentration of said cobalt chloride is about 69 grams per gallon of final solution and the concentration of said sodium nitrite is about 242 grams per gallon of final solution; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

57. The process of claim 56 wherein hydrogen peroxide, $H_2O_2$, in the amount of 0.3 to 0.5 moles per gallon of final solution is added to said cobalt conversion solution to oxidize the cobalt-II ions in solution to cobalt-III ions.

58. The process of claim 56 wherein sodium iodide, NaI, in the amount of about 90 grams per gallon of final solution is added to said cobalt conversion solution to accelerate the formation of said cobalt conversion coating on said substrate.

59. The process of claim 56 wherein said cobalt conversion solution is prepared by a bath makeup sequence comprising:

(a) adding and dissolving said sodium nitrite;

(b) then adding and dissolving sodium iodide, NaI;

(c) then adding and dissolving said cobalt chloride; and (d) then adding said hydrogen peroxide, $H_2O_2$, to the solution.

60. The process of claim 56 wherein said cobalt conversion solution has a pH of about 7.0 to 7.2.

61. The process of claim 56 wherein said cobalt conversion solution has a temperature of about 120°±5° F.

62. The process of claim 56 wherein said substrate is contacted with said cobalt conversion solution for a time of about 15 minutes to 30 minutes.

63. The process of claim 56 comprising the additional step of contacting said coated substrate with an aqueous sealing solution comprising nickel sulfate, NiSO$_4$.6H$_2$O, ammonium nitrate, NH$_4$NO$_3$, and manganese acetate, Mn(CH$_3$COO)$_2$.4H$_2$O.

64. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting cobalt acetate, Co(CH$_3$COO)$_2$.4H$_2$O, with sodium nitrite, NaNO$_2$, wherein the concentration of said cobalt acetate is about 73 grams per gallon of final solution and the concentration of said sodium nitrite is about 242 grams per gallon of final solution; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

65. The process of claim 64 wherein hydrogen peroxide, H$_2$O$_2$, in the amount of 0.3 to 0.5 moles per gallon of final solution is added to said cobalt conversion solution to oxidize the cobalt-II ions in solution to cobalt-III ions.

66. The process of claim 64 wherein sodium iodide, NaI, in the amount of about 90 grams per gallon of final solution is added to said cobalt conversion solution to accelerate the formation of said cobalt conversion coating on said substrate.

67. The process of claim 64 wherein said cobalt conversion solution is prepared by a bath makeup sequence comprising: (a) adding and dissolving said sodium nitrite; (b) then adding and dissolving sodium iodide, NaI;

(c) then adding and dissolving said cobalt acetate; and (d) then adding said hydrogen peroxide, H$_2$O$_2$, to the solution.

68. The process of claim 64 wherein said cobalt conversion solution has a pH of about 7.0 to 7.2.

69. The process of claim 64 wherein said cobalt conversion solution has a temperature of about 120°±5° F.

70. The process of claim 64 wherein said substrate is contacted with said cobalt conversion solution for a time of about 15 minutes to 30 minutes.

71. The process of claim 64 comprising the additional step of contacting said coated substrate with an aqueous sealing solution comprising nickel sulfate, NiSO$_4$.6H$_2$O, ammonium nitrate, NH$_4$NO$_3$, and manganese acetate, Mn(CH$_3$COO)$_2$.4H$_2$O.

72. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution comprising a soluble cobalt-III hexanitrite complex, wherein said cobalt-III hexanitrite complex is present in the form of Me$_3$[Co(NO$_2$)$_6$] wherein Me is one or more selected from the group consisting of Na, K, and Li, and wherein said cobalt-III hexanitrite complex was made by reacting a cobalt-II salt with an alkali metal nitrite such that the concentration of said cobalt-III hexanitrite complex is from about 0.1 mole per gallon of solution to the saturation limit of said cobalt-III hexanitrite complex; and (b) contacting said metal substrate with said solution for a sufficient amount of time to oxidize the surface of said substrate, whereby said oxide film cobalt conversion coating is formed, thereby imparting corrosion resistance and paint adhesion properties to said substrate.

73. The process of claim 72 wherein said cobalt conversion solution has a pH of about 7.0 to 7.2

74. The process of claim 72 wherein said cobalt conversion solution has a temperature of about 68° F. to 150° F.

75. The process of claim 72 wherein said substrate is contacted with said cobalt conversion solution for a time of about 3 minutes to 60 minutes.

76. A process for forming an oxide film cobalt conversion coating exhibiting corrosion resistance and paint adhesion properties on a substrate, wherein said substrate is aluminum, aluminum alloy, magnesium, magnesium alloy, a Cd plated substrate, or a Zn plated substrate, said process comprising the steps of:

(a) providing an oxide film forming cobalt conversion solution comprising an aqueous reaction solution prepared by reacting a cobalt-II salt with an alkali metal nitrite salt, wherein the concentration of said cobalt-II salt is from about 0.1 moles per gallon of final solution to the saturation limit of the cobalt-II salt employed and the concentration of said alkali metal nitrite salt is from about 0.6 to 12 moles per gallon of final solution, and wherein said aqueous reaction solution has a pH of about 7.0 to 7.2; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

77. The process of claim 76 wherein said cobalt-II salt is a cobalt-II salt which has a minimum solubility of about 25 grams per 100 ml of water at 20° C. (68° F.) or a minimum solubility of about 25 grams per 100 ml of water solution containing a metal nitrite salt at 20° C. (68° F.).

78. The process of claims 76 wherein said cobalt-II salt is CoX$_2$ wherein X$_2$ is one or more selected from the group consisting of (NO$_3$)$_2$, Cl$_2$, (CH$_3$COO)$_2$ (acetate), SO$_4$, Br$_2$, (CN)$_2$, (SCN)$_2$, or CO$_3$.

79. The process of claim 76 wherein said metal nitrite salt is MeNO$_2$ wherein Me is one or more selected from the group consisting of Na, K, or Li.

80. The process of claim 76 wherein an oxidizer is added to said cobalt conversion solution to oxidize the cobalt-II ions in solution to cobalt-III ions.

81. The process of claim 80 wherein said oxidizer is hydrogen peroxide, H$_2$O$_2$.

82. The process of claim 76 wherein a reaction accelerator is added to said cobalt conversion solution to accelerate the formation of said cobalt conversion coating on said substrate.

83. The process of claim 82 wherein said reaction accelerator is selected from the group consisting of sodium iodide, NaI, or sodium bromide, NaBr.

84. The process of claim 76 wherein said cobalt conversion solution is prepared by a bath makeup sequence comprising:

(a) adding and dissolving said metal nitrite salt;

(b) then adding and dissolving a reaction accelerator selected from the group consisting of sodium iodide, NaI, or sodium bromide, NaBr;

(c) then adding and dissolving said cobalt-II salt; and (d) then adding hydrogen peroxide, H$_2$O$_2$, to the solution.

85. The process of claim 76 wherein said solution is prepared by reacting said cobalt-II salt with said metal nitrite salt, wherein the molar ratio of said metal nitrite salt to cobalt salt is about 6 to 1 to 14 to 1.

86. The process of claim 76 wherein said cobalt conversion solution has a temperature of about 68° F. to 150° F.

87. The process of claim 76 wherein said substrate is contacted with said cobalt conversion solution for a time of about 3 minutes to 60 minutes.

88. The process of claim 76 comprising the additional step of contacting said coated substrate with an aqueous sealing solution comprising nickel sulfate, $NiSO_4.6H_2O$, ammonium nitrate, $NH_4NO_3$, and manganese acetate, $Mn(CH_3COO)_2.4H_2O$.

* * * * *